I. NORMANDY.
PNEUMATIC TIRE.
APPLICATION FILED APR. 24, 1919.
1,339,782.  Patented May 11, 1920.
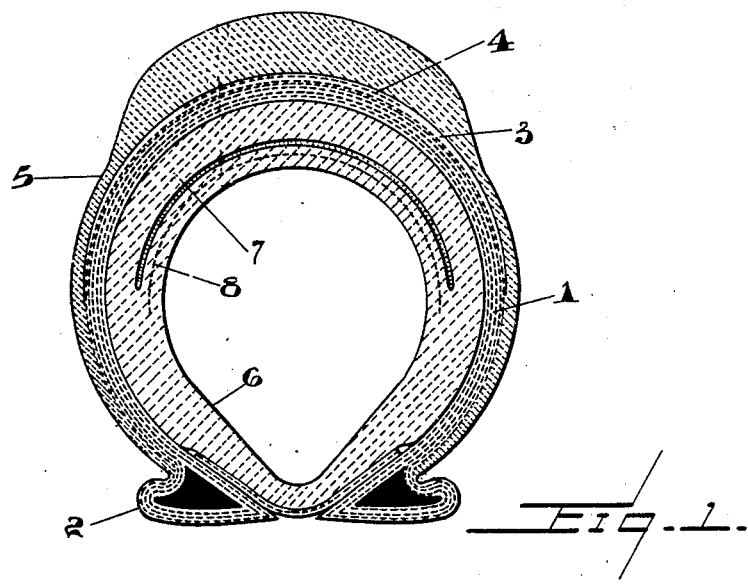
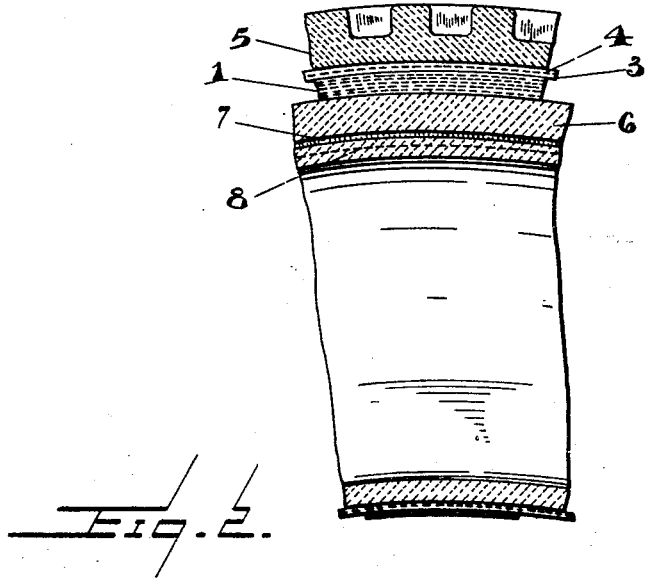
INVENTOR
I. Normandy
BY J. Edward Maybee.
ATTY.

UNITED STATES PATENT OFFICE.

ISAAC NORMANDY, OF ST. CATHARINES, ONTARIO, CANADA, ASSIGNOR, BY DIRECT AND MESNE ASSIGNMENTS, TO ISAAC L. LEO, OF TORONTO, CANADA.

PNEUMATIC TIRE.

1,339,782.	Specification of Letters Patent.	Patented May 11, 1920.

Application filed April 24, 1919. Serial No. 292,317.

*To all whom it may concern:*

Be it known that I, ISAAC NORMANDY, of the city of St. Catharines, in the county of Lincoln, Province of Ontario, Canada, have invented certain new and useful Improvements in Pneumatic Tires, of which the following is a specification.

My object is to devise a pneumatic tire which will be more nearly puncture proof than the ordinary tire and which is adapted to automatically seal any aperture, due to perforation of its wall, which may extend to its interior.

I attain my object by means of the constructions hereinafter described and illustrated in the accompanying drawings in which Figure 1 is a cross section of a tire constructed in accordance with my invention; and Fig. 2 a longitudinal section of part of the same.

In the drawings like numerals of reference indicate corresponding parts in the different figures.

1 is a tire carcass built up of frictioned fabric in the usual way and provided with rim-engaging beads 2, which may be of any ordinary type. To this carcass is applied the usual rubber cushion 3, the breaker strip 4, and the rubber outer covering 5 thickened as usual at the tread.

Within the carcass is located the tubular lining 6, which is united with the inner surface of the carcass preferably by being vulcanized thereto. This lining is thicker at the tread than elsewhere, the thickness of its walls gradually decreasing and being least at the rim side of the lining.

This tubular lining is made of rubber composition, which is more pliable and elastic than that forming the tread covering of the carcass. Embedded in the tread portion of the lining is a stratum 7 of a semi-liquid puncture-filling composition, which may be of any known type and preferably having a rubber base. This stratum is preferably substantially concentric with the inner surface of the lining and extends around the lining part way down each side a sufficient distance to intercept all lines on which punctures are liable to occur.

Intermediate this stratum 7 and the interior of the tube, a band 8, preferably of bias cut fabric, is embodied in the lining. This band is substantially co-extensive with the stratum 7, and forms means for distributing evenly the pressure of the air in the tube over the stratum 7. The thickness of rubber interposed between the interior of the tube and the parts of the outer surface through which punctures are liable to occur is much more extensive than in ordinary tires, and the liability to puncture is very much less. If, however, a puncture does occur, the pressure of the air distributed over the stratum 7 forces a portion of the plastic or semi-liquid material of the stratum into the aperture formed by the puncture, completely and effectively sealing the same.

In practice the inner lining and the carcass will be built up separately and incorporated one with the other on a suitable core and molded and vulcanized together.

In this tire, as the separate inner tube is dispensed with all the ordinary troubles arising from friction, pinching or other causes, when the usual inner tubes are employed, are entirely done away with.

An important advantage follows from the inclusion in the tire of the very considerable thickness of material in the lining. The flexing of the fabric due to sudden blows on more or less sharp bodies is cushioned and spread so that the damage to the fabric of the tire due to stone bruises is eliminated, such damage in ordinary tires being usually due to the localizing of the stress due to the blow.

What I claim as my invention is:—

1. A tubular pneumatic tire comprising a canvas-strengthened carcass provided with rim engaging edges; a rubber tread applied to the carcass; a tubular lining of heavy elastic rubber connected to the interior of the carcass; a stratum of semi-fluid puncture-sealing composition embodied in said tubular lining; and a band of textile fabric embedded in the rubber lining and spaced from the stratum of puncture-sealing composition.

2. A tubular pneumatic tire comprising a canvas-strengthened carcass provided with rim engaging edges; a rubber tread applied to the carcass; a tubular lining of heavy elastic rubber connected to the interior of the carcass; a stratum of semi-fluid puncture-sealing composition embodied in said tubular lining; and a band of textile fabric embedded in the rubber lining and spaced from the stratum of puncture-sealing composition and the inner surface of the lining.

3. A lining tube for a pneumatic tire formed of heavy elastic rubber thicker at the tread than elsewhere and having a stratum of semi-liquid puncture sealing composition embodied in said thickened tread portion extending part way down the side walls and substantially conforming in cross section to the cross sectional contours of the tube, and a band of elastic textile fabric embedded in the tube and spaced from the stratum of puncture-sealing composition and the inner surface of the lining.

Signed at Toronto, Canada, this 15th day of April 1919.

ISAAC NORMANDY.